UNITED STATES PATENT OFFICE 2,566,231

PREPARATION OF MELAMINE

Joseph H. Paden, Glenbrook, and Johnstone S. Mackay, Greenwich, Conn., assignors to American Cyanamid Company, New York, N. Y., a corporation of Maine No Drawing. Application July 17, 1943, Serial No. 495,216

9 Claims. (Cl. 260—249.7)

This invention relates to the preparation of melamine.

The compound commonly known as melamine is a white crystalline solid having a melting point of about 354° C. It has the empirical formula, $C_3N_6H_6$, and is generally believed to have the following structural formula:

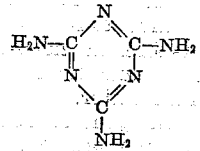

As such, it is frequently called 2,4,6-triamino-1,3,5-triazine. Some of its reactions suggest that it may also exist in whole or in part in one or more isomeric forms such as:

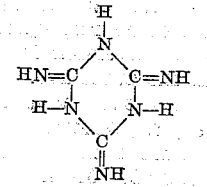

and

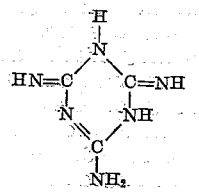

Absolute proof of the exact structure of melamine, or its supposed isomers, has not been definitely established but the term melamine is commonly recognized, and is used herein by us, as including 2,4,6-triamino-1,3,5-triazine and its several isomers.

Although melamine has been known for many years, the only commercially feasible methods for its production have utilized cyanamide or dicyandiamide as starting materials. These latter compounds yield melamine in fair to good yields by polymerization upon heating, either alone or with several different types and kinds of solvents, diluents, catalysts, etc. A few other organic nitrogen compounds, for example, guanidine salts, have been said to yield small percentages of melamine along with various other compounds when heated at temperatures up to about 200° C.

We have now found that melamine can be prepared from urea, its thermal decomposition products, and certain related compounds when these substances are heated at temperatures, and under the conditions, more specifically set forth and described hereinafter. Urea, has the empirical formula $CON_2H_4$ and may be represented by the structural formula

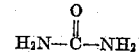

Upon heating, it melts at 132° C. At temperatures above 100° C., and in the presence of water, urea is quickly decomposed to carbon dioxide and ammonia. When slowly heated to 150–160° C. a mole of ammonia is split from two moles of urea to yield biuret. When heated faster to a somewhat higher temperature, cyanic acid and ammonia are formed, the cyanic acid polymerizing immediately to cyanuric acid. It has also been reported that some cyanuric acid triureide $(CN)_3(NHCONH_2)_3$, is formed as a by-product in the formation of cyanuric acid when urea is heated to around 200° C. A small quantity of ammelide and ammonia is formed upon prolonged heating of urea at 190–200° C. and we have found that at higher temperatures ammeline and ammonia are also formed.

We have discovered that when urea is heated at a temperature of 300° C., or preferably higher, melamine is formed along with carbon dioxide and ammonia. The conversion of urea to melamine under these conditions may be illustrated by the general equation:

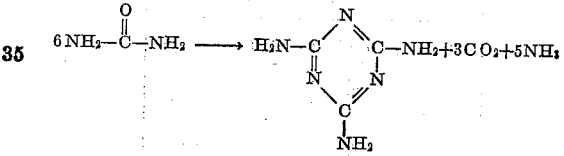

It should be understood, of course, that we do not represent that urea is directly converted to melamine as shown above. The ultimate formation of melamine from urea is probably the result of a series of complex reactions involving urea and/or one or more of its several thermal decomposition products. Under the reaction conditions employed by us to convert urea into melamine, several different reactions may be postulated and it is quite likely that the ultimate formation of melamine is the result of the co-action of several different intermediate reactions taking place simultaneously but at different reaction rates. Since the exact chemical mechanism of the conversion of urea to melamine has not as yet been definitely established by us, we do not wish to be bound by any theory or supposed course of reaction. The fact remains that urea and its thermal decomposition products can be converted into melamine, ammonia and carbon dioxide, under the conditions of our new process as set forth and claimed herein.

When urea is heated in a closed vessel at 300° C., without anything present in the reaction vessel other than urea and its thermal decomposition products, the formation of melamine is rather slow. For example, 60 g. of urea was charged into an autoclave having a capacity of 300 cc. The autoclave was then closed and heated to a temperature of 300° C. and held at this temperature for two hours. It was then cooled by immersion in cold water, opened and the contents thereof analyzed. Melamine representing a theoretical yield of 7.2% based on the equation given above, was found in the autoclave. Upon longer heating, particularly in the presence of ammonia, higher yields of melamine are obtained.

When urea is heated at higher temperatures melamine is formed in a much shorter period of time. For example, at 350° C. melamine representing 77.2% of the theoretical yield was obtained upon heating urea in an autoclave for two hours. Upon heating for six hours at 350° C. a 94.0% yield of melamine was obtained. At temperatures above 350° C. excellent yields of melamine are obtained within a very short period of time. The formation of melamine in good yields at these higher temperatures is most surprising since it is known that melamine commences to decompose when heated at temperatures of 350° C. and higher.

In order to demonstrate the effects of temperature upon the conversion of urea to melamine, a series of experiments was made. In each of several runs 60 g. of urea was placed in a 300 cc. autoclave and heated under the autogenously developed pressure at selected temperatures. After heating the autoclave up to its designated temperature, it was held at that temperature for fifteen minutes (except as indicated) and thereupon immediately cooled, opened and the contents analyzed. The results of this series of experiments are as follows:

Table

| Reaction Temp. | Time to Reaction Temp. | Time at Reaction Temp. | Yield Melamine |
|---|---|---|---|
| ° C. | Minutes | Minutes | Per cent |
| 300 | 43 | 120 | 7.2 |
| 350 | 55 | 15 | 37.0 |
| 400 | 73 | 15 | 89.0 |
| 425 | 82 | 15 | 88.0 |
| 450 | 97 | 15 | 80.0 |
| 475 | 118 | 15 | 71.0 |
| 500 | 104 | 10 | 72.0 |

The yields of melamine obtained at temperatures of 350° C. and higher indicate that it is possible to obtain excellent yields of melamine from urea in a matter of minutes at the higher temperatures.

It might appear from the results shown in the table that an optimum yield of melamine is obtained at about 400° C. This is not necessarily true. As pointed out before, melamine commences to decompose at about 350° C. and it would be expected that continued heating at higher temperatures would eventually result in decreased yields of melamine. The results of the table indicate, therefore, that at temperatures above 400° C. the autoclave was heated longer than necessary to obtain optimum yields of melamine. Additional work done by us shows that this is true and that very good yields of melamine are obtained by heating urea at temperatures of 500° C. or even higher for only a few minutes. Since, in commercial production the time factor is important, we accordingly prefer to operate under a temperature range of from about 350° C. up to about 600° C. At 350° C. we prefer a heating time of not more than 6 hours, at 400° C. a heating time of not more than about one-half hour and at 500° C. a heating time of not more than about 10 minutes.

In the course of our numerous experiments in converting urea to melamine, we have observed that when the conversion is carried out at temperatures above 350° C. and when a portion of the reaction zone is at a temperature of less than 350° C., as for example, when the upper end of the autoclave is unheated, that the melamine formed during the reaction is, to a considerable extent, sublimed and condensed on the cooler parts of the autoclave in the form of fine, needle-like crystals having an extraordinarily high degree of purity. As a result we are able to collect these melamine crystals and obtain melamine in an unusually pure form. This is an unexpected advantage of our invention and a valuable part thereof. The unsublimed melamine can be recovered from the residue in the autoclave by recrystallization from water.

As shown by the general reaction equation given above, ammonia and carbon dioxide are evolved during the process. Naturally, the formation of these gases, and possibly other gaseous intermediate decomposition products of urea, tend to create a pressure in the autoclave. The amount of this autogenously developed pressure depends, of course, upon the temperature at which the conversion is carried out and the free space in the autoclave. In a test run in which a 300 cc. autoclave was used with a charge of 60 g. of urea, a pressure of approximately 2500 lbs. per square inch was developed at a temperature of 350° C. In another series of experiments an autoclave having a capacity of 1300 cc. was charged with 60 g. of urea and the autoclave was heated to a temperature of 350° C. for two hours. During this run a maximum pressure of 175 lbs. was obtained. The run was repeated using 120 g. of urea in the autoclave. This time a maximum pressure of 350 lbs. per square inch was observed. In still another run 240 g. of urea was charged into the 1300 cc. autoclave and the autoclave heated to 350° C. A maximum pressure of 550 lbs. per square inch was noted. In each of these runs melamine was obtained in good yields and the pressure did not appear to be a particularly critical factor. In still another run 60 g. of urea was charged into a 300 cc. autoclave and the autoclave was then closed and heated to 350° C. Pressure on the autoclave was then released by allowing the gases that had formed therein to escape. Heating at atmospheric pressure was then continued for two hours after which the autoclave was cooled, opened and the contents analyzed. Melamine representing a 10.4% theoretical yield was obtained. In view of these results, and others, it appears that better yields are obtained under pressure and, accordingly, we prefer to operate our process under a pressure of at least 100 lbs. per square inch, more preferably the autogenously developed pressure of the reaction.

Under some conditions it may be desirable to operate our process at pressures less than the autogenously developed pressure of the reaction. This may be done by simply providing suitable relief valves on the reaction vessel or by the addition to the reaction mass, or by placing in communication therewith, suitable absorbent or adsorbents for the gases evolved.

A number of experiments were made at pressures higher than the autogenously developed pressure of the reaction. This was accomplished by the addition of ammonia to the autoclave before it was heated. As a result of these experiments, it was found that the conversion of urea to melamine takes place with good yields at pressures in excess of those autogenously developed, even as high as 5000 lbs. per square inch, and higher.

During the course of these experiments, it was observed that better yields of melamine could be obtained particularly at the lower temperature ranges when ammonia was present in added amounts in the reaction zone. For example, when 60 g. of urea was added to a 300 cc. autoclave and heated at 270° C. for two hours under the autogenously developed pressure, less than ½ of 1% of the theoretical amount of melamine was formed. However, when 25 g. of NH₃ was added to the autoclave, a yield of 10.6% of melamine was obtained under the same conditions. At 300° C. with no additional ammonia present a yield of 7.2% melamine was obtained in two hours. When 25 g. of ammonia was added to the autoclave a yield of 27.0% melamine was obtained at 300° C. in two hours. These results show that the conversion of urea to melamine can be carried out at lower temperatures with better yields when the conversion is conducted in an atmosphere of ammonia. Accordingly, we wish to include within the scope of our invention the conversion of urea to melamine in an atmosphere of ammonia at temperatures of 270° C. and higher.

In addition to the foregoing we have found that ammonia exerts a stabilizing effect upon melamine which makes it possible for us to produce melamine at temperatures above its normal decomposition temperatures. When 60 g. of melamine were placed in an autoclave and heated at 400° C. for two hours, it was found that when the autoclave was cooled and opened only 52% of the original melamine could be recovered as such from the residue in the autoclave. However, when this experiment was repeated with an autoclave charge of 60 g. of melamine and 25 g. of ammonia, 96.5% of the melamine was recovered unchanged after heating at 400° C. for two hours. Quite obviously, the presence of ammonia in the system had a stabilizing effect upon the melamine and prevented its thermal decomposition to a high degree. For this reason also we prefer to carry out our process in an atmosphere containing ammonia gas. The ammonia gas may be either derived from decomposition of the starting material or it may be added as free ammonia.

As previously noted, biuret, cyanuric acid, ammelide and ammeline, together with ammonia, are thermal decomposition products of urea when this compound is heated up to 300° C. Since our process involves the heating of urea to very high temperatures, some or all of these various thermal decomposition products are, no doubt, present in the reaction zone and may themselves be converted into melamine. To determine this as a fact, a series of experiments was run in which various thermal decomposition products of urea were placed in an autoclave and heated at temperatures of about 270° C. and higher.

In one such experiment 35 g. of biuret was placed in an autoclave having a capacity of 300 cc. The autoclave was closed and heated up to 350° C. and held at this temperature for two hours. The autoclave was then cooled, opened and its contents analyzed. Melamine representing a theoretical yield of 55% was obtained as the result of this experiment. The conversion of biuret to melamine may be represented by the equation:

$$6NH_2-\overset{O}{\overset{\|}{C}}-\overset{H}{\overset{|}{N}}-\overset{O}{\overset{\|}{C}}-NH_2 \longrightarrow$$

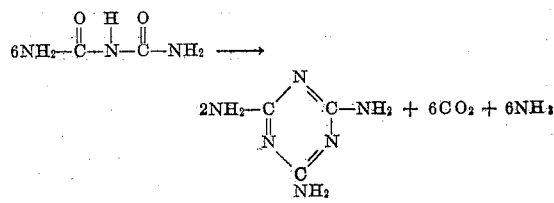

The compound guanylurea is similar in structure to urea and biuret as shown by the following structural formula $$R-NH-\overset{O}{\overset{\|}{C}}-NH_2$$

in which R is hydrogen when the formula represents urea, R is the carbamyl radical, $$NH_2-\overset{O}{\overset{\|}{C}}-$$

when the formula represents biuret and R is the guanyl radical, $$NH_2-\overset{NH}{\overset{\|}{C}}-$$

when the formula represents guanylurea. Since urea and biuret both yield melamine when heated at 300° C., or higher, experiments were run with guanylurea. In one such experiment 50 grams of guanylurea was placed in an autoclave and heated to 350° C. for two hours. Upon analysis of the contents of the autoclave it was found that the guanylurea had been converted to melamine in yields of 58.2% of theoretical when based on the following equation:

$$2NH_2-\overset{NH}{\overset{\|}{C}}-NH-\overset{O}{\overset{\|}{C}}-NH_2 \longrightarrow$$

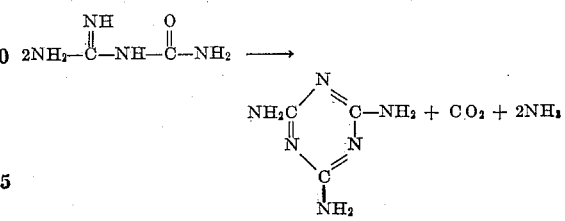

Ammonium cyanate is another compound that can be converted into melamine by our process as described herein. However, as is generally known, ammonium cyanate is an isomer of urea and is rapidly and completely converted into urea when heated. Accordingly when starting our process with ammonium cyanate, this material is transformed to urea before reaction temperatures sufficiently high to produce melamine are reached. For this reason, we intend that the word urea as used herein and in our appended claims includes the use of isomers thereof such as, specifically, ammonium cyanate.

In other experiments we found that cyanuric acid, ammelide and ammeline may be converted into melamine by heating with ammonia under substantially the same reaction conditions that are necessary when using urea as a starting material. Since these compounds differ from urea, in requiring ammonia to complete their conversion to melamine and as they possess a heterocyclic triazine structure and have other fundamentally different chemical and physical properties, their use in the manufacture of melamine is not claimed specifically herein but forms the subject matter of our co-pending application Serial No. 508,246 filed October 29, 1943.

Another important advantage of our invention arises from the fact that when urea, its thermal decomposition products, and guanylurea are heated to form melamine, ammonia and carbon dioxide are formed as by-products. These useful gases can be combined, with the elimination of water, to yield urea which may then be used in the process. In this way it is possible to convert practically all of the starting materials into melamine as a final product.

When urea is used alone as starting material, ammonia and carbon dioxide are formed as by-product gases in the molecular proportions required for the formation of urea. The same is true when guanylurea is used as starting material. When biuret, cyanuric acid, ammelide and ammeline are used as starting materials, ammonia and carbon dioxide are also present as by-product gases and these gases may be utilized to make urea. Most processes of synthesizing urea require a comparatively large excess of ammonia but as shown hereinabove our process may be operated to better advantage, in most cases, when added ammonia is present in the reaction zone. Accordingly the by-product gases from our process are very suitable for direct conversion into urea by known processes.

We claim:

1. A process for the production of melamine which comprises heating urea and ammonia from an external source in a pressure resistant vessel at a temperature in the range of from 300° C. to 500° C. and under a pressure range of from 200 atmospheres to 300 atmospheres whereby melamine is produced and recovering the thus produced melamine.

2. A process for the production of melamine which comprises heating urea and ammonia from an external source in a pressure resistant vessel at a temperature of at least about 270° C. and under a pressure of at least about 200 atmospheres whereby melamine is produced and recovering the thus produced melamine.

3. In a process for the synthesis of melamine the steps which comprise heating urea in a pressure-resistant vessel at a temperature of at least about 270° C. under superatmospheric pressure, whereby a reaction product containing melamine is formed, and thereafter separating melamine from the said reaction product.

4. In a process for the synthesis of melamine the steps which comprise heating urea under substantially anhydrous conditions to a temperature of at least 350° C. and a pressure of at least 100 pounds per square inch in a pressure resistant vessel, whereby a reaction product containing melamine is formed and thereafter recovering melamine from the reaction vessel.

5. A process of preparing melamine which comprises the steps of heating urea under substantially anhydrous conditions and under a pressure of at least 100 pounds per square inch in a pressure resistant vessel at a temperature of at least 400° C. until melamine is formed but not for more than about one half hour and recovering melamine from said reaction vessel.

6. A process of preparing melamine which comprises the steps of heating urea under substantially anhydrous conditions and under a pressure of at least 100 pounds per square inch in a pressure resistant vessel at a temperature of at least 500° C. until melamine is formed but not for more than about ten minutes and recovering melamine from said reaction vessel.

7. A process of preparing melamine which comprises heating urea in a pressure resistant vessel without anything being present therein other than urea and its thermal decomposition products to a temperature of at least 350° C. under the autogenously developed pressure of the reaction until melamine is formed and thereafter separating melamine from the reaction product.

8. A process for the synthesis of melamine which comprises the steps of introducing urea into a reaction vessel, the conditions of the reaction being such that the reaction zone is under substantially anhydrous conditions and being at a temperature of at least about 400° C., the pressure being at least 100 pounds per square inch and the time not more than about one half hour and recovering melamine from said reaction vessel.

9. A process for the synthesis of melamine which comprises the steps of introducing urea and ammonia into a reaction vessel, the conditions of the reaction being such that the reaction zone is under substantially anhydrous conditions and being at a temperature of at least about 400° C., the pressure being at least 100 pounds per square inch and the time not more than about one half hour and recovering melamine from said reaction vessel.

JOSEPH H. PADEN.
JOHNSTONE S. MACKAY.

REFERENCES CITED

The following references are of record in the file of this patent:

UNITED STATES PATENTS

| Number | Name | Date |
|---|---|---|
| 1,902,889 | Paquin | Mar. 28, 1933 |
| 2,101,807 | Corey | Dec. 7, 1937 |
| 2,142,965 | Hale | Jan. 3, 1939 |
| 2,164,705 | Fisch | July 4, 1939 |
| 2,191,361 | Widmer | Feb. 20, 1941 |
| 2,301,629 | King | Nov. 10, 1942 |

FOREIGN PATENTS

| Number | Country | Date |
|---|---|---|
| 337,394 | Great Britain | 1930 |
| 527,237 | Germany | 1931 |